(12) United States Patent
Archer et al.

(10) Patent No.: US 7,669,075 B2
(45) Date of Patent: *Feb. 23, 2010

(54) ROW FAULT DETECTION SYSTEM

(75) Inventors: Charles Jens Archer, Rochester, MN (US); Kurt Walter Pinnow, Rochester, MN (US); Joseph D. Ratterman, Rochester, MN (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/197,556

(22) Filed: Aug. 25, 2008

(65) Prior Publication Data

US 2008/0320329 A1 Dec. 25, 2008

Related U.S. Application Data

(63) Continuation of application No. 11/052,660, filed on Feb. 7, 2005, now Pat. No. 7,437,595.

(51) Int. Cl.
*G06F 11/00* (2006.01)

(52) U.S. Cl. .......................................... 714/4; 709/223

(58) Field of Classification Search ........................ None
See application file for complete search history.

(56) References Cited

U.S. PATENT DOCUMENTS

| | | | |
|---|---|---|---|
| 4,320,508 A | 3/1982 | Takezoe | |
| 5,230,047 A | 7/1993 | Frey et al. | |
| 5,325,518 A | 6/1994 | Bianchini | |
| 5,537,653 A | 7/1996 | Bianchini | |
| 5,561,769 A | 10/1996 | Kumar et al. | |
| 5,684,807 A | 11/1997 | Bianchini et al. | |
| 5,920,267 A | 7/1999 | Tattersall et al. | |
| 6,108,796 A | 8/2000 | Lasken | |
| 6,714,552 B1 | 3/2004 | Cotter | |
| 6,880,100 B2 | 4/2005 | Mora et al. | |
| 7,046,621 B2 | 5/2006 | Wang et al. | |
| 7,058,008 B1 | 6/2006 | Wilson et al. | |
| 7,058,848 B2 | 6/2006 | Sicola et al. | |
| 7,085,959 B2 | 8/2006 | Safford | |
| 7,139,925 B2 | 11/2006 | Dinker et al. | |
| 7,149,920 B2 | 12/2006 | Blumrich et al. | |
| 2001/0052084 A1 | 12/2001 | Huang et al. | |
| 2002/0133756 A1 | 9/2002 | Jain | |
| 2003/0023893 A1 | 1/2003 | Lee et al. | |
| 2003/0198251 A1 | 10/2003 | Black et al. | |

(Continued)

OTHER PUBLICATIONS

Park, et al., "Fault-Tolerant Broadcasting in Wormhole-Routed Torus Networks", Proceedings of the International Parallel and Distributed Processing Symposium, 2002 (6 pages).

(Continued)

*Primary Examiner*—Yolanda L Wilson
(74) *Attorney, Agent, or Firm*—Wood, Herron & Evans, LLP

(57) ABSTRACT

An apparatus and program product check for nodal faults in a row of nodes by causing each node in the row to concurrently communicate with its adjacent neighbor nodes in the row. The communications are analyzed to determine a presence of a faulty node or connection.

20 Claims, 3 Drawing Sheets

U.S. PATENT DOCUMENTS

2004/0008719 A1  1/2004  Ying
2005/0198097 A1  9/2005  Kalnitsky
2005/0246569 A1  11/2005 Ballew et al.
2006/0117212 A1  6/2006  Meyer et al.

OTHER PUBLICATIONS

Azeez, et al., "I/O Node Placement for Performance and Reliability in Torus Networks", Proceedings of the 18th Iasted International Conference on Parallel and Distributed Computing and Systems (PDCS), 2006 (6 pages).

Cunningham, et al., "Fault-Tolerant Adaptive Routing for Two-Dimensional Meshes", IEEExplore.

Almasi, et al., "Optimization of MPI Collective Communication on BlueGene/L Systems", ICS '05, Jun. 20-22, Boston, MA, USA (10 pages).

ROW FAULT DETECTION SYSTEM

CROSS-REFERENCE TO RELATED APPLICATIONS

This application is a continuation of U.S. patent application Ser. No. 11/052,660, filed on Feb. 7, 2005 by Charles Jens Archer et al. and is related to the following U.S. patent applications all filed on Feb. 7, 2005, by Charles Jens Archer, et al.: Ser. No. 11/052,658, entitled ALL-TO-ALL SEQUENCED FAULT DETECTION SYSTEM,", Ser. No. 11/052,659, entitled "CELL BOUNDARY FAULT DETECTION SYSTEM,", Ser. No. 11/052,661, entitled "MULTI-DIRECTIONAL FAULT DETECTION SYSTEM,", Ser. No. 11/052,663, entitled "BISECTIONAL FAULT DETECTION SYSTEM,", and Ser. No. 11/052,662, entitled "ALL ROW, PLANAR FAULT DETECTION SYSTEM,". The present application is also related to U.S. patent application filed on Feb. 7, 2005 by John A. Gunnels et al., Ser. No. 11/050,945, entitled "SYSTEM AND METHOD FOR DETECTING A FAULTY OBJECT IN A SYSTEM," and to Ser. Nos. 12/165,732 and 12/165,784, filed on Jul. 1, 2008, which are continuations of the aforementioned Ser. No. 11/052,661 and to Ser. Nos. 12/196,889 and 12/196,931, filed on Aug. 22, 2008, which are continuations of the aforementioned Ser. No. 11/052,663. In addition, this application is related to U.S. patent application Ser. No. 12/196,931 filed on even date herewith by Charles Jens Archer, et al., which is a continuation of the aforementioned Ser. No. 11/052,660. Each of these applications is incorporated by reference herein.

This invention was made with Government support under Contract No. B519700 awarded by the Department of Energy. The Government has certain rights in this invention.

FIELD OF THE INVENTION

The invention is generally directed to parallel processing computer systems, and in particular, to fault detection in parallel processing computer systems.

BACKGROUND OF THE INVENTION

Parallel processing computer systems have found application in a number of different computing scenarios, particularly those requiring high performance and fault tolerance. For instance, airlines rely on parallel processing to process customer information, forecast demand and decide what fares to charge. The medical community uses parallel processing supercomputers to analyze magnetic resonance images and to study models of bone implant systems. A parallel processing architecture generally allows several processors having their own memory to work simultaneously. Parallel computing systems thus enable networked processing resources, or nodes, to cooperatively perform computer tasks.

The best candidates for parallel processing typically include projects that require many different computations. Unlike single processor computers that perform computations sequentially, parallel processing systems can perform several computations at once, drastically reducing the time it takes to complete a project. Overall performance is increased because multiple nodes can handle a larger number of tasks in parallel than could a single computer.

Other advantageous features of some parallel processing systems regard their scalable, or modular nature. This modular characteristic allows system designers to add or subtract nodes from a system according to specific operating requirements of a user. Parallel processing systems may further utilize load balancing to fairly distribute work among nodes, preventing individual nodes from becoming overloaded, and maximizing overall system performance. In this manner, a task that might otherwise take several days on a single processing machine can be completed in minutes.

In addition to providing superior processing capabilities, parallel processing computers allow an improved level of redundancy, or fault tolerance. Should any one node in a parallel processing system fail, the operations previously performed by that node may be handled by other nodes in the system. Tasks may thus be accomplished irrespective of particular node failures that could otherwise cause a failure in non-parallel processing environments.

Despite the improved fault tolerance afforded by parallel computing systems, however, faulty nodes can hinder performance in the aggregate. It consequently becomes necessary to eventually replace or otherwise fix underperforming nodes and/or associated connections. For instance, it may be advantageous to check for faulty cables, software, processors, memory and interconnections as modular computing components are added to a parallel computing system.

The relatively large number of nodes used in some such systems, however, can complicate node maintenance. Ironically, the very redundancy that enables fault tolerance can sometimes challenge processes used to find faulty nodes. With so many nodes and alternative data paths, it may be difficult to pinpoint the address, or even the general region of a node, or nodal connection requiring service.

As such, a significant need exists for a more effective way of determining and locating faulty nodes in a parallel processing environment.

SUMMARY OF THE INVENTION

The invention addresses these and other problems associated with the prior art by providing an improved apparatus and program product that may check for nodal faults in a row of nodes by causing each node in the row to concurrently communicate with its adjacent neighbor nodes in the row. The communications are analyzed to determine a presence of a faulty node or connection. To this end, aspects of the invention may automatically determine the row, as well as which nodes of the row are adjacent to one another. An adjacent node for purposes of this specification may include a node having a direct connection to another.

Where desired, complete analysis of the row communications may be accomplished prior to moving on to another row for subsequent evaluation. This sequencing, e.g., by not evaluating all rows at once, may mitigate instances where the system could otherwise become overwhelmed by receiving too much data at once. An aspect of the invention may further evaluate rows in other planes. This feature may provide for triangulation of different rows, pinpointing a potential nodal fault.

The information pertaining to the nodal fault may be logged and/or used to initiate servicing of the fault. The communications may further be evaluated in terms of latency and bandwidth conformance.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
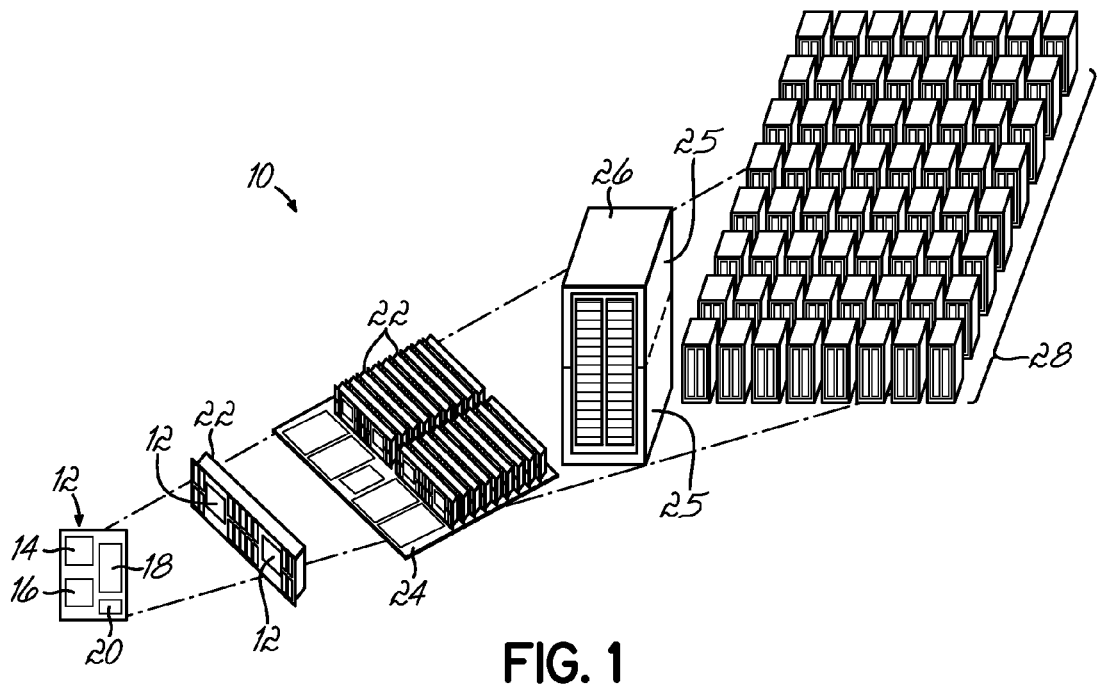
FIG. 1 is a block diagram that includes components of a parallel processing system configured to detect nodal faults using a scalable algorithm that causes each node in a row to send a packet to its neighboring nodes in the row.

Parallel computing systems, such as the BlueGene/L system created by International Business Machines, often include a node cellular architecture. As discuss below in detail, the BlueGene/L system is built from blocks of node midplanes that may be connected through several inter and intra midplane networks. The system may be constructed incrementally, with midplane cells being added to build the larger, final system. As each midplane is added to the system, the hardware and system software must be tested for faulty configurations, including interconnect, processing, memory and software control.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. Torus implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane.

The torus network and cellular characteristic of the system permit dynamic rerouting around problematic nodes and links, or nodal faults. However, increased communication costs are incurred each time a rerouted communication must travel through a different level of organization, e.g., node, midplane, etc. For instance, it may take more time for a data packet to be routed over to an adjacent cell than would it to another node in the same cell. This may be because the data packet would have to travel over additional cabling that connects to respective faces of adjacent cells, requiring relatively more travel and processing time. It is consequently desirable to promptly detect and service nodal faults in order to minimize associated boundary changes and rerouting. Unfortunately, the very redundancy designed into the system complicates conventional processes used to find nodal faults. With so many nodes and alternative data paths, pinpointing the location of a node or nodal connection requiring service may be problematic.

To address this need, the present invention capitalizes on features of the system to detect faulty torus links, miscabled midplanes, and bad hardware in general. For instance, compute Application Specific Integrated Circuits (ASIC's) of the BlueGene/L include error detection registers. An error detection register may, for instance, register the number of torus retransmits for each direction. Aspects of the invention may use this data to help pinpoint hardware failures after tests are run. The BlueGene/L compute ASIC will also deliver interrupts to the operating system if the hardware is put into an exceptional state. These two features thus provide a basis for internal (via software) and external (via the control system or system monitoring facilities) fault detection capability.

The processes of the present invention may include first booting the system via a control system. The program code loads may take place using a control network that is completely independent of the torus. Once the program code is loaded on the system and the hardware is initialized, the tests consistent with the invention may be run. After the tests complete, data collection may be performed either via the external hardware interfaces, or through the software interfaces.

Aspects of the invention include a system configured to detect nodal faults using a scalable algorithm that may cause each node in a row to simultaneously transmit a data packet to its two, immediate neighbors in the row. This feature allows for relatively quick identification of a nodal fault within a row of a cell, or grouping of nodes. The nodes may send and receive data in an attempt to maximize the bandwidth between the communication partners and flush out nodes that are not performing well.

An embodiment consistent with the invention checks the linear communications links around a ring in a single dimension, allowing the tester to find degraded links by calculating the performance of each node. In this case, since each node only sends the data over a single hop, it is easier to look at the performance of individual nodes to determine if a bad link exists, and between which two nodes it may be found. When run against all three dimensions, more information can be found about the nature of the problem. For example, if the communication is always poor between a single node and any other with which it is paired, it is likely to be a bad node, whereas a node that only performs poorly in a single dimension is likely to be caused by the actual link connecting it to the other nodes.

Since the only communication in this test occurs with the nearest neighbors, there is no contention for link resources. This allows the test to run in constant time, irrespective of the number of nodes in the system.

Turning to the Drawings, wherein like numbers may denote like parts throughout several views, FIG. 1 shows components 12, 22, 24, 26 of a parallel processing system 28 configured to cause each node 12 in the row to concurrently communicate with its adjacent neighbor nodes 12 in the row, i.e., all in a row checking. FIG. 1 more particularly shows a parallel computing system 28, or apparatus, such as the BlueGene/L system created by International Business Machines. The system 28 comprises a highly scalable, cellular architecture that can be replicated in a regular pattern, with no introduction of bottlenecks as the system is scaled up.

The parallel processing system 28 fundamentally includes a plurality of nodes 12. Each node 12 typically comprises two Application Specific Integrated Circuits (ASIC's) 14, 16, a local cache memory 18 and an Input/Output (I/O) interface 20. ASIC's 14, 16 share external memory 29 located on a card 22, onto which two nodes 12 mount. Sixteen cards 22 are typically placed on a node board 24. Sixteen node boards 24 comprise a midplane, or cell 25, two of which may be positioned inside a cabinet 26 for a total of 1024 nodes, or 512 nodes per cell. The system 28 includes sixty-four cabinets and over sixty-five thousand nodes.

The nodes 12 may be interconnected through multiple, complementary high-speed and low latency networks. The networks typically include a three-dimensional torus network that wraps around the edges, and a combining tree network for fast global operations. The torus network includes point to point, serial links between routers embedded within the system ASIC's. As such, each ASIC has six nearest neighbor connections, some of which may traverse relatively long cables.

Though not shown, the system 28 may include a front end, host computer used for compiling, diagnostics and/or analysis. An I/O node of the system 28 may handle communications between a compute node and other systems, including the host and file servers. The choice of host may depend on the class of applications, as well as their bandwidth and performance requirements.

Figure 2:
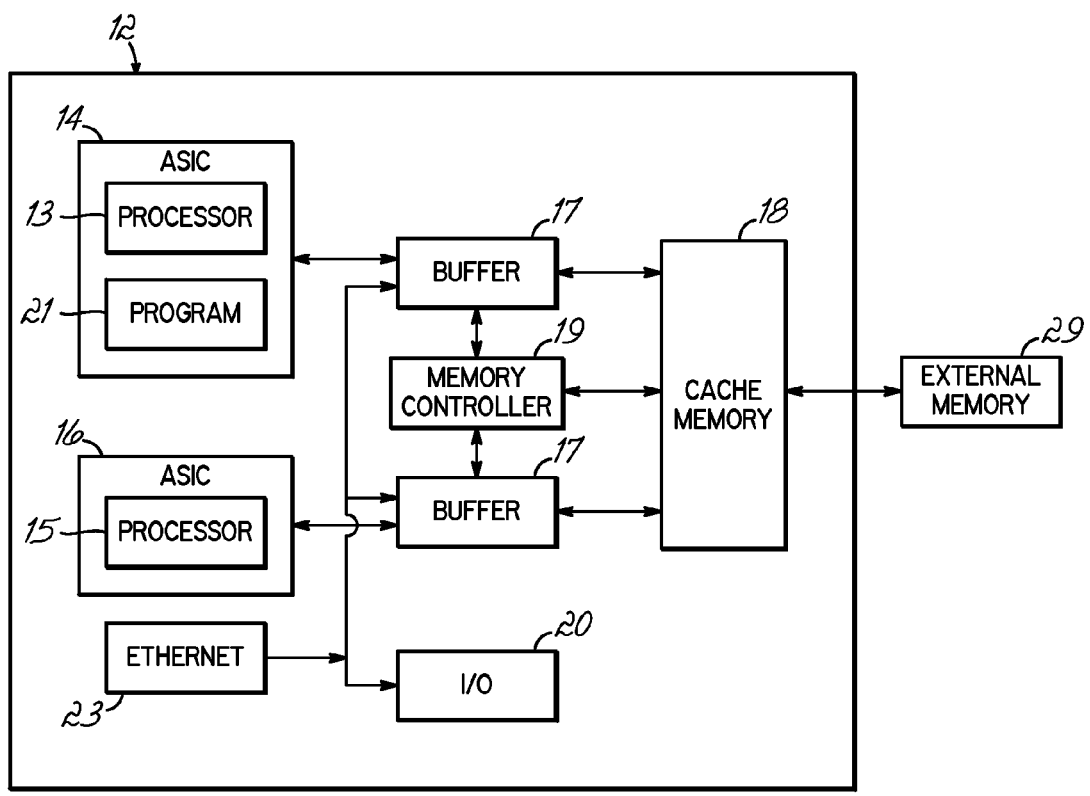
FIG. 2 is a block diagram of a node of the parallel processing system of FIG. 1.

FIG. 2 is a block diagram of a node 12 of the parallel processing system 28 of FIG. 1. The BlueGene/L node 12 includes a compute ASIC 14 comprising necessary network interfaces and on chip memory. An on chip memory controller 19 provides access to local cache memory 18, such as Synchronous Dynamic Random Access Memory (SDRAM) memory chips.

In addition to the compute ASIC 14, each node 12 may include a link ASIC 16 for messaging. When crossing a cell boundary, network interrupt signals pass through the link ASIC 16. This link ASIC 16 re-drives signals over cables between cells and redirects signals between its different ports. These design features allow improved signal quality and less traffic interference. These features also enable additional cells to be cabled as spares to the system and used, as needed, upon failures. Each of the partitions formed through this manner has its own torus, tree and barrier networks that are isolated from all traffic from all other partitions.

Processors 13, 15 of the respective ASIC's 14, 16 thus communicate with the cache memory 18, memory controller 19 and associated buffers 17. Furthermore, one or more of the processors 13, 15 may couple to a number of external devices, including an input/output interface 20, memory 29, a workstation controller (not shown) and an Ethernet interface 23.

One skilled in the art will appreciate that any number of alternate computer architectures may be used in the alternative. That is, while the node 12 of FIG. 2 comprises a specific hardware implementation having particular application within the context of an embodiment consistent with the invention, it is not intended to limit the scope of the invention. It should consequently be appreciated that the invention may be implemented in other computers and data processing systems, e.g., in single or multi user computers such as workstations, desktop computers, portable computers, server computers and the like, or in other programmable electronic devices (e.g., incorporating embedded controllers and the like). That is, the number of card, processors, slots, etc., and network configurations may change according to application specifications.

The discussion hereinafter will focus on the specific routines utilized to implement the above described system 28. The routines executed to implement the embodiments of the invention, whether implemented as part of an operating system or a specific application, component, program, object, module or sequence of instructions executed by node or other processors, will also be referred to herein as "computer program code," or simply "program code." The computer program code typically comprises one or more instructions that are resident at various times in various memory and storage devices in a computer, and that, when read and executed by one or more nodal or other processors of a computer system, cause that system to perform the steps necessary to execute steps or elements embodying the various aspects of the invention. For instance, program 21 may enable checking for nodal faults in a row. "Nodal" for purpose of this specification may refer to the hardware or software relating to a node, including a connection associated with a node.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD ROM's, DVD's, etc.), among others, and transmission type media such as digital and analog communication links.

In addition, various program codes described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 3:
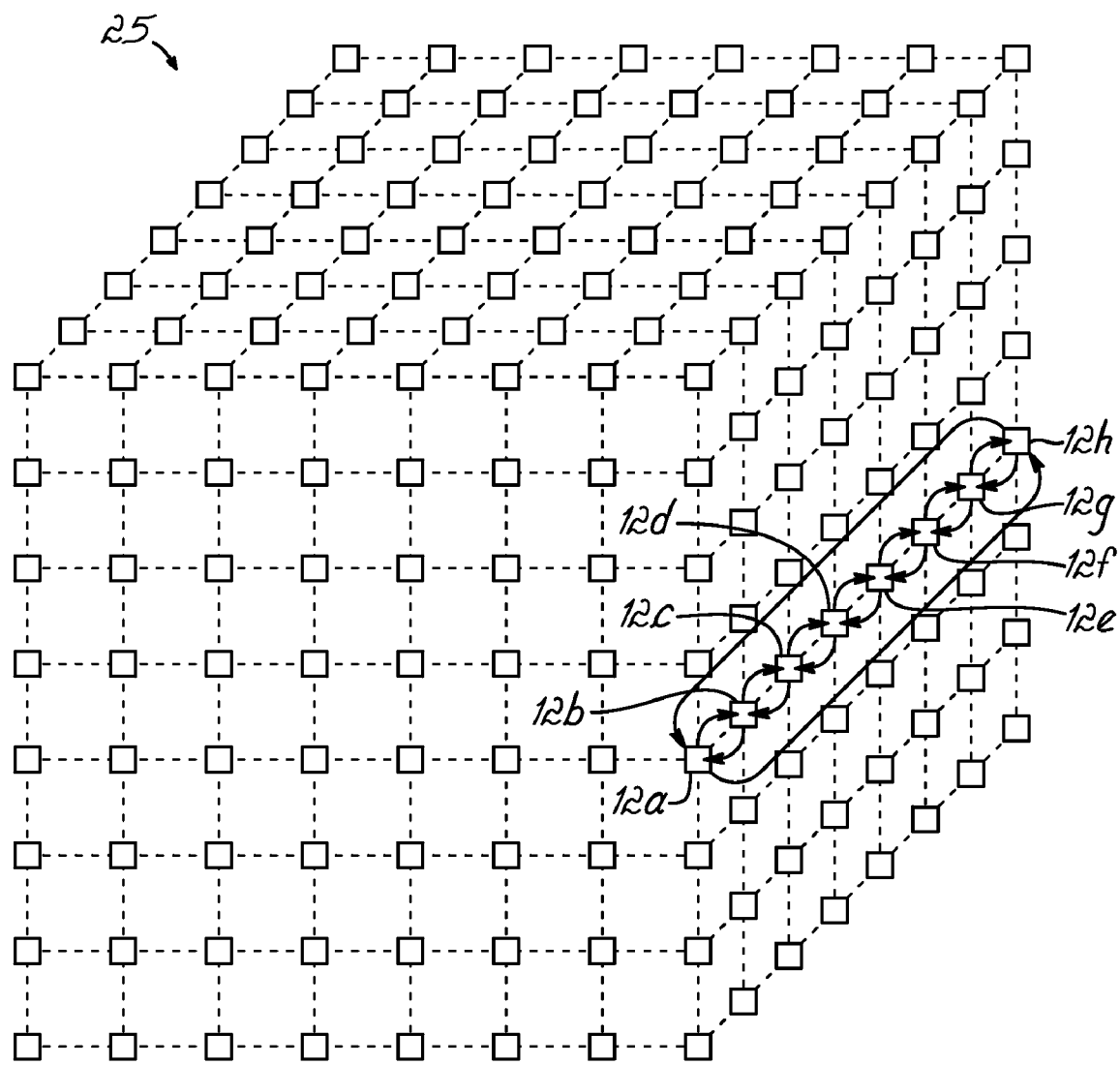
FIG. 3 is a block diagram of a midplane of the parallel processing system of FIG. 1.

FIG. 3 is a block diagram of a midplane, or cell 25, of the parallel processing system 28 of FIG. 1. The cell 25 includes an eight-by-eight-by-eight structure of 512 interconnected computing nodes. In the context of the present invention, the cell 25 includes a row of nodes, or a communicator, comprising nodes 12a-h. Node 12a has coordinates (7,3,0), 12b has coordinates (7,3,1), 12b has coordinates (7,3,2), and so on, incrementing in the z-direction. For processing considerations, node 12a may be internally designated "node 0," node 12b may be "1," node 12c may be "2," and so on continuing to 12h, or "7." Each node 12a-12h in a row may simultaneously send a packet to both its neighboring nodes in the same row, or communicator. Namely, node 12b may send a data transmission to both nodes 12a and 12c. Node 12c may send a packet to both 12b and 12d. Node 12a may wrap around the communicator row to communicate simultaneously with both nodes 12b and 12h. As such, the term, "adjacent," for purposes of the specification includes logically and proximally neighboring nodes, i.e., sharing a direct connection. The communications may be analyzed to determine if there is a nodal fault associated with any node, software or connection associated with the communicator. Other communicators are typically created and tested during a testing sequence. Moreover, the communicators may include rows extending in the x-z and y-z planes, in addition to addition rows in the x-y plane as shown in FIG. 3.

Those skilled in the art will recognize that the exemplary environments illustrated in FIGS. 1-3 are not intended to limit the present invention. While the nodes 12 of FIGS. 1-3 are shown connected in a modular fashion, any combination of local area networks (LAN's), wide area networks (WAN's) and/or other networking topologies known in the art may alternatively be used to network computing processors comprising nodes. Individual nodes may thus not be physically located in close proximity with other nodes, i.e., be geographically separated from other nodes as is well known in the art. Moreover, a wide variety of interconnection types, network types, member types, etc., may be permitted to coexist with one another in an efficient and reliable manner in parallel computing system. Indeed, those skilled in the art will recognize that other alternative hardware and/or software environments may be used without departing from the scope of the invention.

Figure 4:
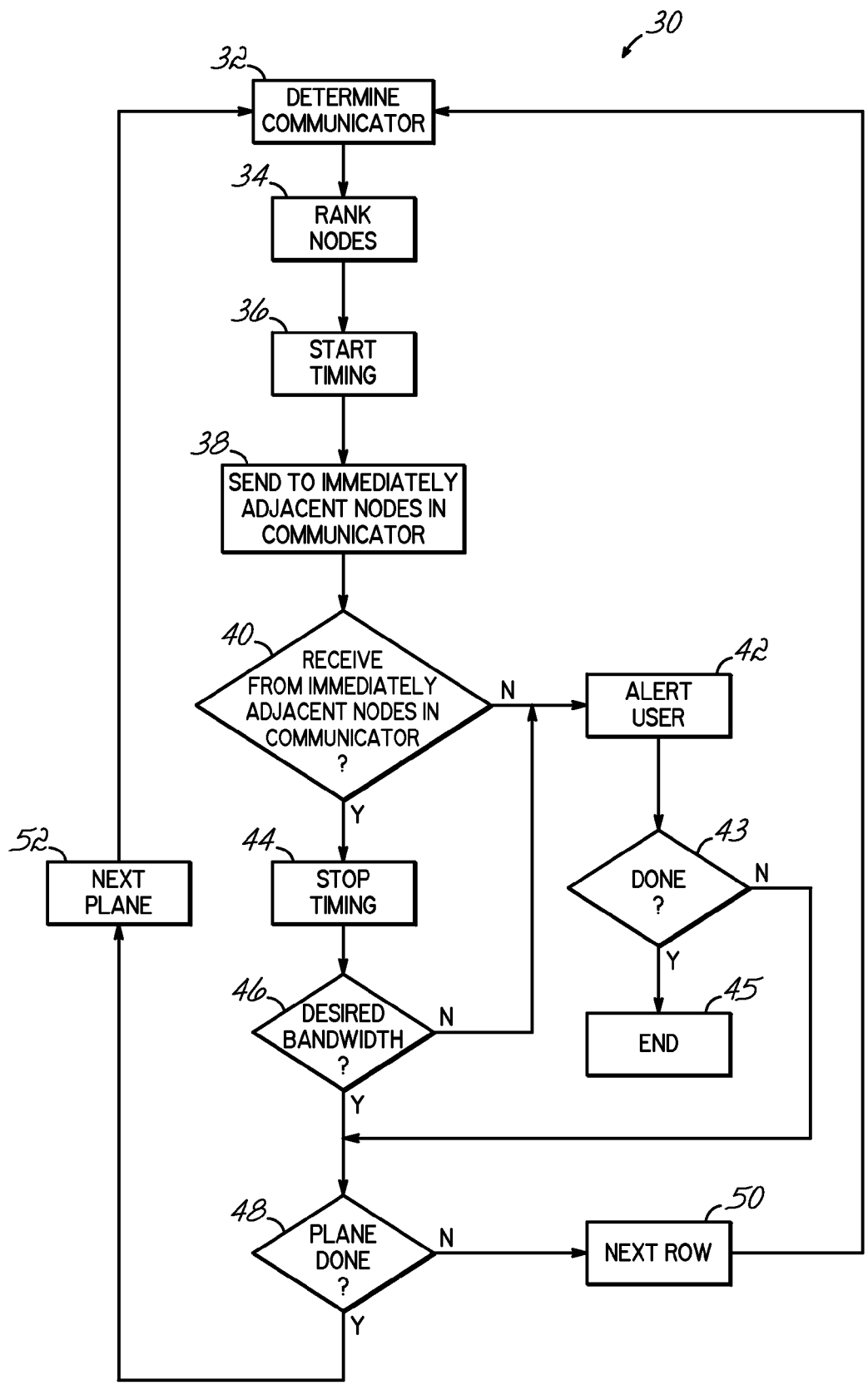
FIG. 4 is a flowchart having a set of exemplary steps executable by the system of FIG. 1 for conducting an all-in-a-row nodal fault test.

FIG. 4 is a flowchart 30 having a set of exemplary steps executable by the system 28 of FIG. 1 for conducting an all-in-a-row nodal fault test. More particularly, the system 28 at block 32 may determine members of a first communicator. For instance, the system 28 may decide to begin testing in a given plane, e.g., the x-y plane, as shown in FIG. 3. After creating a communicator comprising a row of nodes 12a-12h, the system 28 may rank the nodes 12a-12h at block 34. For instance, the system may accomplish a hashing function at block 34 that assigns a number and order used to determine the manner in which nodes will communicate within the communicator.

An internal counting software may begin timing a testing sequence at block 36. As discussed herein, the timing may be used to evaluate the performance characteristics of data packets communicated within the communicator. To this end, each node 12a-h of the communicator may send at block 38 a data packet to each of its neighbors within the communicator.

If a node fails to receive at block 40 two communications (one from each immediate neighbor), then the system 28 may alert a user at block 42. For instance, an error log may be generated, in addition to an electronic message prompt sent to a system administrator. Generation of an error at block 42 may thus coincide with the presence of a nodal fault somewhere within the communicator. If more links and nodes need to be tested at block 43, then the sequence may continue at block 48. The test may otherwise conclude at block 45.

Where the node alternatively receives the appropriate communications at block 40, then the timing mechanism may cease at block 44. The system may thus have the timing information need to determine if a desired rate of data transmission, or bandwidth, was achieved at block 46. If not, then the user may be alerted back at block 42. Though not shown, one skilled in the art will appreciate that other performance parameters, including latency, may alternatively or additionally be determined at block 46.

The system 28 may likewise evaluate other rows in a plane at blocks 50 and 52, until all rows in a plane have been evaluated at block 48. The system 28 may then evaluate all rows in the next plane, and so on. Notably, testing in multiple planes may promote triangulation of potentially problematic node and/or connections, permitting a user and/or the system 28 to potentially pinpoint a nodal fault.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Additional advantages and modifications will readily appear to those skilled in the art.

One skilled in the art will further appreciate that while the processes of the present invention may provide particular advantages within the context of parallel processing systems, the principles of the invention further may apply to many other applications, to include most nodal fault detection operations. Furthermore, while cells discussed herein are described generally in the context of midplanes, one skilled in the art will appreciate that a midplane is just one type of cell in accordance with the principles of the present invention.

Moreover, while a cell comprises a grouping of nodes as discussed herein, a cell more particularly includes a grouping of nodes that communicates more quickly with each other than with other nodes. For instance, intra-cell communications generally require less cabling and associated routing processes. Furthermore, while the midplane cell of FIG. 3 shows a cubical structure, one skilled in the art will appreciate that cells may take on additional symmetric and asymmetric shapes, including those having more or less than six faces. Relatedly, while the torus network is a three dimensional network, networks and associated hardware/software may implicate fewer or more dimensions. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus, comprising:
a plurality of nodes, including a first row of nodes, wherein at least one node includes a hardware-implemented processor;
a network connecting the plurality of nodes; and
program code executed by at least one of the plurality of nodes, the program code configured to cause each of the nodes of the first row to communicate with adjacent nodes also within the first row; and to determine from the communications between the adjacent nodes within the first row a nodal fault relating to at least one of the nodes and the network, wherein the program code initiates sequencing to a different plane of nodes and causing each node within a second row located within the different plane to communicate with adjacent nodes also within the second row.

2. The apparatus of claim 1, wherein the program code causes nodes of a second row of the plurality of nodes to wait to communicate while nodes of the first row communicate.

3. The apparatus of claim 1, wherein each node communicates concurrently.

4. The apparatus of claim 1, wherein the program code initiates determining if a first node in the row is adjacent to a second node in the row.

5. The apparatus of claim 1, wherein the program code initiates sequencing to a second row and causing each node within the second row to communicate with adjacent nodes also within the second row.

6. The apparatus of claim 1, wherein the program code initiates using communications from nodes of different rows residing in different planes to pinpoint the nodal fault.

7. The apparatus of claim 1, further comprising a memory for storing information pertaining to the nodal fault.

8. The apparatus of claim 1, wherein the program code initiates notifying a person to service the nodal fault.

9. The apparatus of claim 1, wherein the program code initiates determining a latency associated with a nodal communication.

10. The apparatus of claim 1, wherein the program code initiates determining a bandwidth associated with a nodal communication.

11. A program product, comprising:
a recordable type media; and
program code stored on the recordable type media to be executed on a processor for determining a nodal fault and configured to be executed by at least one of a plurality of nodes, wherein the program code is further configured to determine a row among the plurality of nodes, and to cause each node of the row to communicate with adjacent nodes also within the row and to determine from the communications between the adjacent nodes within the row the nodal fault relating to at least one of the nodes and the network, wherein the program code initiates sequencing to a different plane of nodes and causing each node within a second row located within the different plane to communicate with adjacent nodes also within the second row.

12. An apparatus, comprising:

a plurality of nodes, including a first row of nodes, wherein at least one node includes a hardware-implemented processor;

a network connecting the plurality of nodes; and program code executed by at least one of the plurality of nodes, the program code configured to cause each of the nodes of the first row to communicate with adjacent nodes also within the first row; and to determine from the communications between the adjacent nodes within the first row a nodal fault relating to at least one of the nodes and the network, wherein the program code initiates using communications from nodes of different rows residing in different planes to pinpoint the nodal fault.

13. The apparatus of claim 12, wherein the program code causes nodes of a second row of the plurality of nodes to wait to communicate while nodes of the first row communicate.

14. The apparatus of claim 12, wherein each node communicates concurrently.

15. The apparatus of claim 12, wherein the program code initiates determining if a first node in the row is adjacent to a second node in the row.

16. The apparatus of claim 12, wherein the program code initiates sequencing to a second row and causing each node within the second row to communicate with adjacent nodes also within the second row.

17. The apparatus of claim 12, wherein the program code initiates notifying a person to service the nodal fault.

18. The apparatus of claim 12, wherein the program code initiates determining a latency associated with a nodal communication.

19. The apparatus of claim 12, wherein the program code initiates determining a bandwidth associated with a nodal communication.

20. A program product, comprising:

a recordable type media; and program code stored on the recordable type media to be executed on a processor for determining a nodal fault and configured to be executed by at least one of a plurality of nodes, wherein the program code is further configured to determine a row among the plurality of nodes, and to cause each node of the row to communicate with adjacent nodes also within the row and to determine from the communications between the adjacent nodes within the row the nodal fault relating to at least one of the nodes and the network, wherein the program code initiates using communications from nodes of different rows residing in different planes to pinpoint the nodal fault.

* * * * *